United States Patent [19]

Kosako

[11] Patent Number: 6,006,038
[45] Date of Patent: Dec. 21, 1999

[54] CAMERA HAVING APPARATUS FOR ADJUSTING DIOPTER OF VIEW FINDER AND DIOPTER ADJUSTING MECHANISM FOR FINDER OPTICAL SYSTEM OF CAMERA

[75] Inventor: Kosei Kosako, Tokyo, Japan

[73] Assignee: Asahi Kogaku Kogyo Kabushiki Kaisha, Tokyo, Japan

[21] Appl. No.: 09/231,815

[22] Filed: Jan. 15, 1999

[30] Foreign Application Priority Data

Jan. 20, 1998 [JP] Japan .................................. 10-009019

[51] Int. Cl.⁶ .......................... G03B 13/02; G03B 13/06; G03B 17/02
[52] U.S. Cl. ............................ 396/29; 396/373; 396/382; 396/536
[58] Field of Search ................................. 396/25, 27, 29, 396/144, 148, 297, 299, 373, 380, 382, 435, 436, 535, 536, 543; 359/425, 414, 825

[56] References Cited

U.S. PATENT DOCUMENTS

| | | | |
|---|---|---|---|
| 4,164,369 | 8/1979 | Urano et al. | 396/373 |
| 4,206,988 | 6/1980 | Miyamoto et al. | 396/384 |
| 4,268,151 | 5/1981 | Kobori et al. | 396/382 |
| 4,712,897 | 12/1987 | Crema | 396/373 |
| 5,412,445 | 5/1995 | Mori et al. | 396/25 |
| 5,515,124 | 5/1996 | Kurosawa et al. | 396/310 |
| 5,541,684 | 7/1996 | Suzuki et al. | 396/435 |
| 5,621,568 | 4/1997 | Hasushita et al. | 359/432 |
| 5,625,487 | 4/1997 | Hasushita et al. | 359/432 |
| 5,790,908 | 8/1998 | Matsuda | 396/379 |
| 5,822,622 | 10/1998 | Inoue | 396/27 |

*Primary Examiner*—Eddie C. Lee
*Attorney, Agent, or Firm*—Greenblum & Bernstein, P.L.C.

[57] ABSTRACT

A camera which includes a camera body, a rear cover, and a diopter adjusting mechanism having a diopter adjustment lens for a finder optical system, including: a diopter adjustment knob provided on the rear cover; a transmission member connected to the diopter adjustment knob so as to relatively move in the direction along the axis of rotation of the knob and not to relatively rotate thereto; a biasing spring which biases the transmission member to project toward the camera body side; a lens association rotation member which is supported by the camera body so as to rotate about an axis identical to the axis of the knob and which moves the diopter adjustment lens in the optical axis direction, in accordance with the rotation of the lens association rotation member; and at least one rotation transmission projection and recess provided on one and the other of the transmission member and the lens association rotation member; the transmission member projects to a projected position close to the camera body when the rotation transmission projection engages with the rotation transmission recess, and is retracted to a retracted position in the rear cover when the rotation transmission projection does not engage with the rotation transmission recess.

11 Claims, 6 Drawing Sheets

CAMERA HAVING APPARATUS FOR ADJUSTING DIOPTER OF VIEW FINDER AND DIOPTER ADJUSTING MECHANISM FOR FINDER OPTICAL SYSTEM OF CAMERA

BACKGROUND OF THE INVENTION

1. Field of the Invention

The present invention relates to a camera having an apparatus for adjusting a diopter of a view finder and a diopter adjusting mechanism for a finder optical system of a camera.

2. Description of the Related Art

In general, a view window of a view finder in a camera is provided on a rear surface of a camera body and a diopter adjusting mechanism therefor is provided in the vicinity of the view window. In a water-proof or drip-proof camera in which the rear surface of the camera is almost entirely defined by an openable rear cover, a diopter adjusting operation member and a drive mechanism for a diopter adjustment lens are provided on the rear cover and in the camera body, respectively. However, in this arrangement in which the operation member is disconnected from the drive mechanism when the rear cover is opened, if the operation member is actuated when the operation member is disconnected from the drive mechanism, the phase of the operation member becomes different from the phase of the drive mechanism. Consequently, even if an operator tries to close the rear cover, the rear cover cannot be closed due to an interference between the operation member and the drive mechanism. This makes it difficult to incorporate the diopter adjusting mechanism in a camera in which the operation member and the drive mechanism for the diopter adjustment lens are respectively provided on the rear cover and in the camera body.

SUMMARY OF THE INVENTION

It is an object of the present invention to provide a camera or a diopter adjusting mechanism in which an operation member and a drive mechanism for a diopter adjustment lens are separately provided on a rear cover and in a camera body, wherein the rear cover can be closed properly and can be properly re-connected to the lens drive mechanism even if there is a phase difference between the lens drive mechanism and the operation member, whereby the operation efficiency of the camera can be enhanced.

To achieve the above-mentioned object of the present invention, according to the present invention, there is provided a camera having apparatus for adjusting a diopter of a view finder which includes a camera body, a rear cover which opens and closes the rear surface of the camera body, and a diopter adjusting mechanism for a finder optical system, the diopter adjusting mechanism having a diopter adjustment lens, including: a diopter adjustment knob provided on the rear cover, which can be externally rotated; a transmission member provided on the rear cover that is opposed to the camera body and connected to the diopter adjustment knob so as to relatively move in the direction along the axis of rotation of the diopter adjustment knob and not to relatively rotate thereto; a biasing spring which biases the transmission member to project toward the camera body side; a lens association rotation member which is supported by the camera body so as to rotate about an axis identical to the axis of the diopter adjustment knob and which moves the diopter adjustment lens in the optical axis direction, in accordance with the rotation of the lens association rotation member; and at least one rotation transmission projection and at least one rotation transmission recess provided on one and the other of the transmission member and the lens association rotation member; wherein the transmission member is biased by the biasing spring wherein the transmission member projects to a projected position close to the camera body when the rotation transmission projection engages with the rotation transmission recess, and is retracted to a retracted position in the rear cover when the rotation transmission projection does not engage with the rotation transmission recess. With this arrangement, even if the phase of the lens association rotation member (the lens drive mechanism) does not agree with the phase of the operation member, not only can the rear cover be closed, but also the operation member can be connected to the lens association rotation member (the lens drive mechanism) via a certain amount of rotation of the operation member, thus resulting in an enhanced operation efficiency.

In an embodiment, the diopter adjustment knob is provided with a shaft portion which projects toward the camera body; the transmission member is provided with a through hole in which the shaft portion is slidably fitted in the axial direction and at least one rotation transmission projection which projects toward the camera body; the camera further includes an integral rotation member, separate from the diopter adjustment knob, which is secured to the front end of the shaft portion of the diopter adjustment knob to rotate together therewith, an engagement hole formed in the integral rotation member, in which the rotation transmission projection of the transmission member is fitted so as to move in the projecting direction of the projection, and so as not to move in the rotational direction; whereby when the diopter adjustment knob is rotated, the rotation is transmitted to the transmission member through the engagement hole of the integral rotation member and the rotation transmission projection of the transmission member.

According to another aspect of the present invention, there is provided a diopter adjusting mechanism for a finder optical system of a camera having a camera body and a rear cover, including: a diopter adjustment lens provided in the camera body, movable in an optical axis thereof; a lens association rotation member which moves the diopter adjustment lens in the optical axis direction by the rotation thereof, the lens association rotation member being provided in the camera body; a manually rotatable diopter adjustment knob provided on the rear cover; a transmission member provided on the rear cover, the transmission member being connected to the diopter adjustment knob relatively movable in the axial direction and so as to rotate together with the diopter adjustment knob; a rotation transmission projection and a rotation transmission recess provided on one and the other of the transmission member and said lens association rotation member; and a biasing spring which biases the transmission member to project toward the lens association rotation member to engage the rotation transmission projection with the rotation transmission recess; wherein the biasing spring allows to retract the transmission member in the rear cover when the rotation transmission projection does not engage with the rotation transmission recess.

In the camera or the diopter adjusting mechanism of present invention, preferably, the biasing spring is a compression coil spring provided between the transmission member and the rear cover.

Preferably, the camera is a water-proof and drip-proof camera and wherein said diopter adjustment knob and the rear cover are sealed water-tight by a sealing member.

Preferably an association cam member is provided, which is moveable in a direction substantially perpendicular to the optical axis, having at least one cam groove in which a projection of said diopter adjustment lens slidably engages; wherein the diopter adjustment lens can be moved backward or forward along the optical axis via the corresponding linear movement of the association cam member.

Preferably, the lens association rotation member includes a gear portion and the association cam member includes a rack which engages with the gear portion; wherein the association cam member is linearly moved via the rotational movement of the association rotation member.

The present disclosure relates to subject matter contained in Japanese Patent Application No. 10-9019 (filed on Jan. 20, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
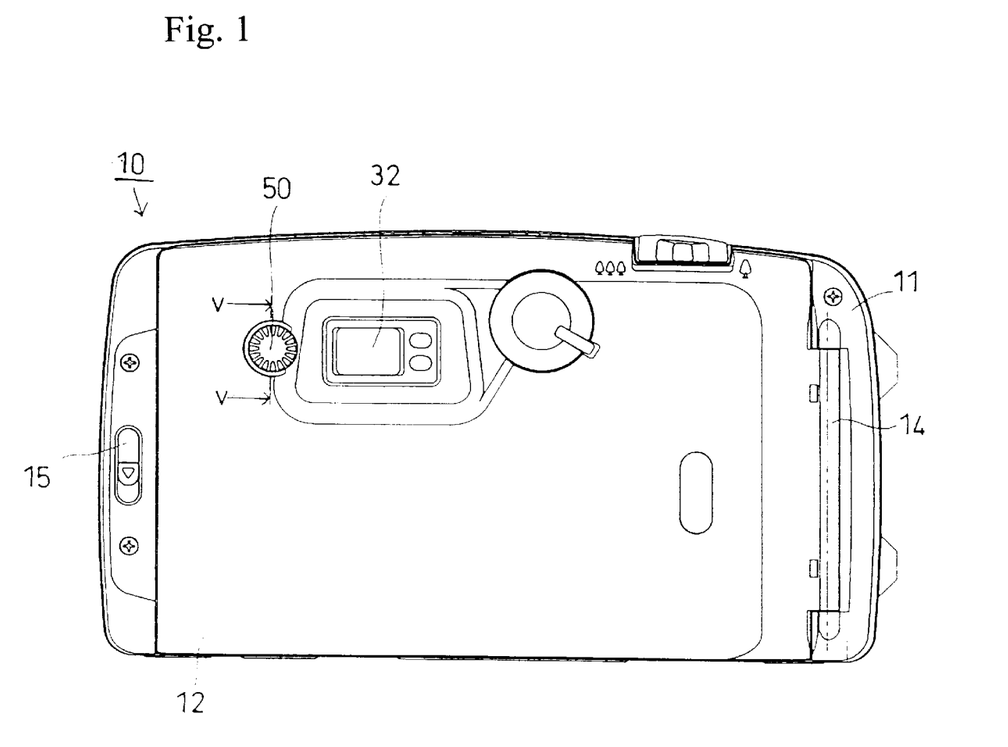
FIG. 1 is a back view of a camera having a finder diopter adjusting mechanism.

FIG. 1 shows a rear view of a water-proof/drip-proof type of compact zoom camera 10. A camera body 11 is provided with a rear cover 12 which almost entirely covers the rear surface of the camera body 11. The space between the camera body 11 and the rear cover 12 is sealed in a water-tight fashion by a packing (not shown). The rear cover 12 is connected to the camera body 11 by means of a hinge 14 and is locked in a closed position by a lock mechanism (not shown). The rear cover 12 can be unlocked by an unlocking lever 15 provided on the camera body 11.

The compact zoom camera 10 is provided with a real image type of finder optical system separate from a photographing optical system. An object image formed by the finder optical system can be viewed through a finder view window 32 provided on the rear cover 12.

Figure 2:
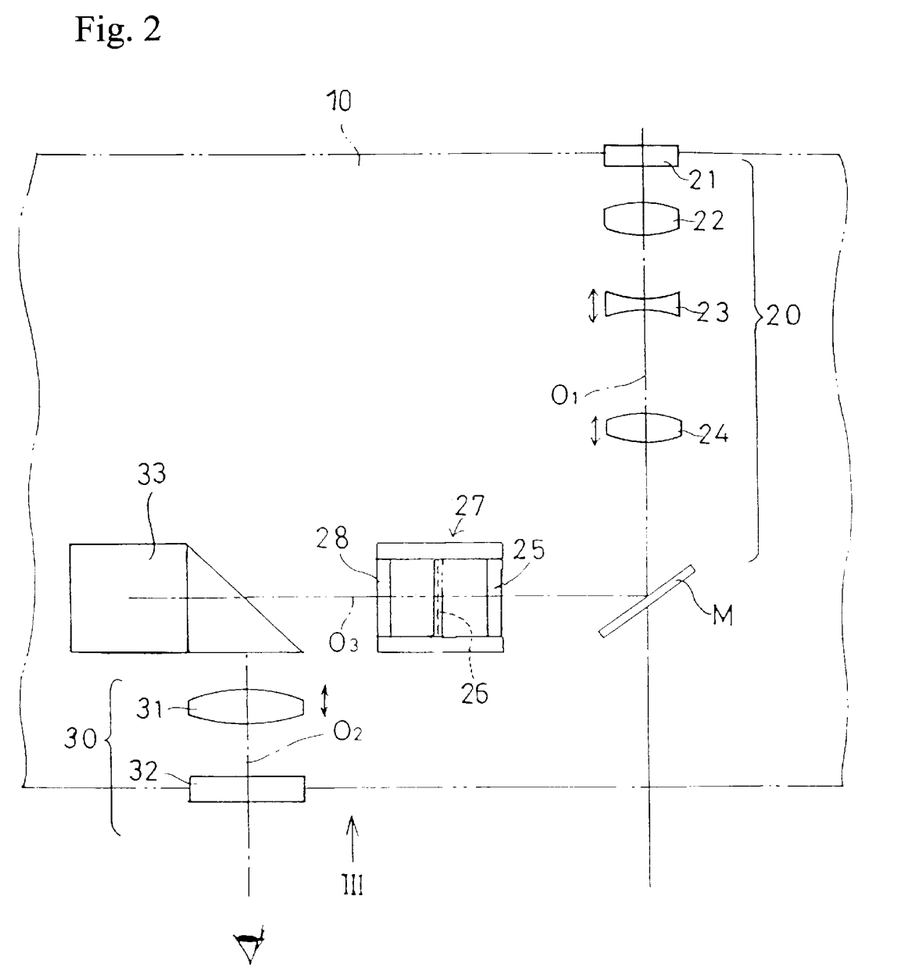
FIG. 2 is a plan view of a finder optical system of a camera, by way of example.
Figure 3:
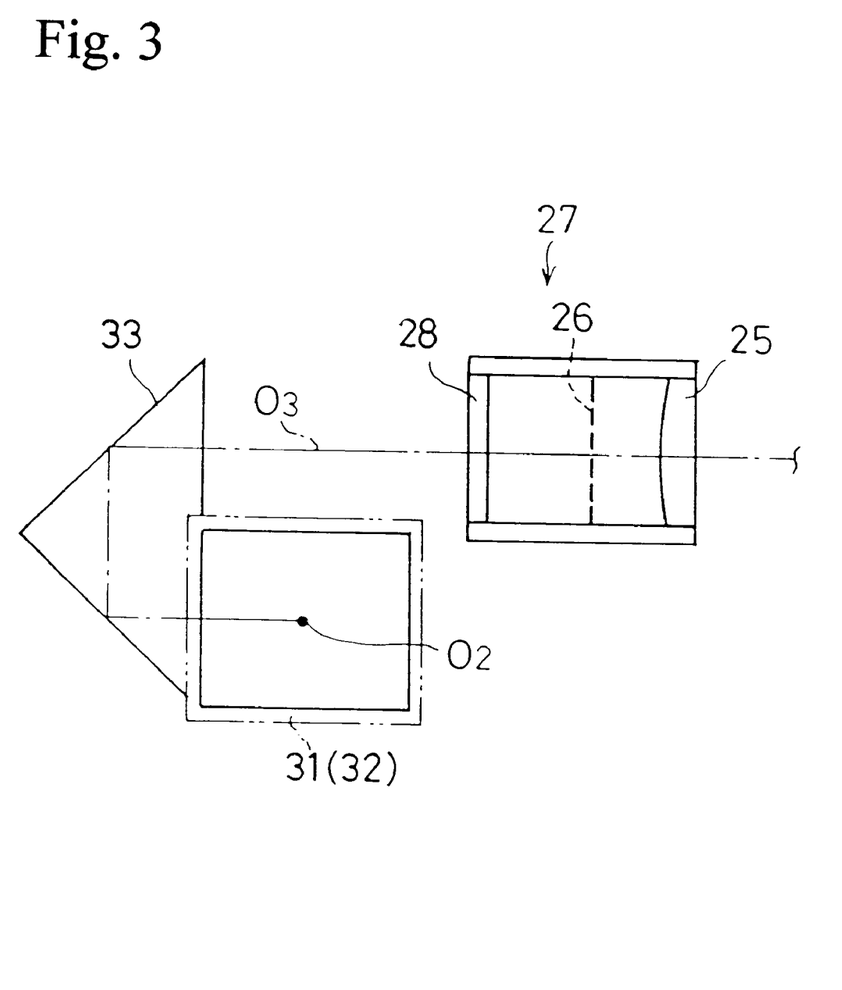
FIG. 3 is an end view viewed from the direction III in FIG. 2.

FIGS. 2 and 3 show a real-image finder by way of example. In the view finder, the optical axis 02 of an objective optical system 20 is parallel with the optical axis 02 of an ocular optical system 30. Light incident upon the objective optical system 20 travels along the light path thereof, is bent by 90 degrees by means of a mirror M, and travels along the optical axis 03. Thereafter, the light is made incident upon a Porro prism 33 and is reflected by three reflection surfaces thereof so as to travel along the optical axis 02. The four reflection surfaces including the mirror M and the three reflection surfaces of the Porro prism 33 constitute an image erection optical system.

The objective optical system 20 includes stationary lenses 21, 22, and movable zoom lenses 23, 24. The objective optical system 20 is provided on the optical axis 01 to form a real image of an object to be viewed onto a primary image forming surface 26. The zoom lenses 23 and 24 are moved in the direction of the optical axis 01 in accordance with a change in the focal length of a zoom lens barrel (not shown) to vary the finder magnification. The primary image forming surface 26 and transparent plane-parallel plates 25 and 28 are located on the optical axis 03 to constitute a seal unit 27 in which the primary image forming surface and the vicinity thereof form a dust-proof structure. The ocular optical system 30 is composed of a diopter adjustment lens 31 and a stationary finder view window 32. The diopter adjustment lens 31 is movable in the direction of the optical axis 02 to adjust the diopter.

Figure 4:
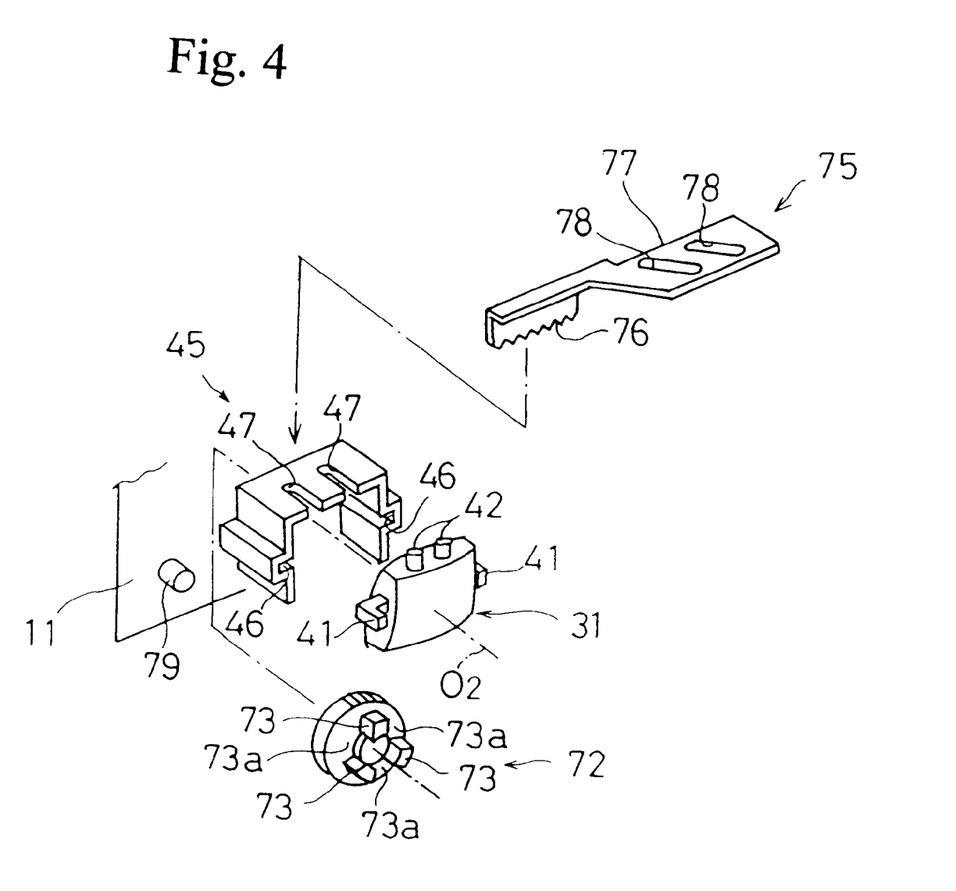
FIG. 4 is a perspective view of a diopter adjustment lens and a support and drive mechanism thereof.

In FIG. 4 which shows a moving and supporting structure of the diopter adjustment lens 31; the lens 31 is provided on the opposed side surfaces thereof with a pair of slide projections 41 and on the upper surface with a pair of drive projections 42. The camera body 11 is provided therein with a movement guide frame 45 which is adapted to guide the movement of the diopter adjustment lens 31 in the direction of the optical axis 02. The guide frame 45 is equipped therein with a pair of sliding movement guide grooves 46 in which the slide projections 41 of the diopter adjustment lens 31 are slidably fitted and a pair of through-slots 47 in which the drive projections 42 are slidably fitted, wherein the ends of the drive projections 42 can project outward from the guide frame 45. The through holes 47 extend in the direction of the optical axis 02. The slide projections 41 are fitted in the guide grooves 46 and the drive projections 42 are fitted in the elongated holes 47, wherein the diopter adjustment lens 31 is supported so as to move in the direction of the optical axis 02. Note that the guide frame 45 constitutes a part of a finder block which supports the entire finder.

Figure 5:
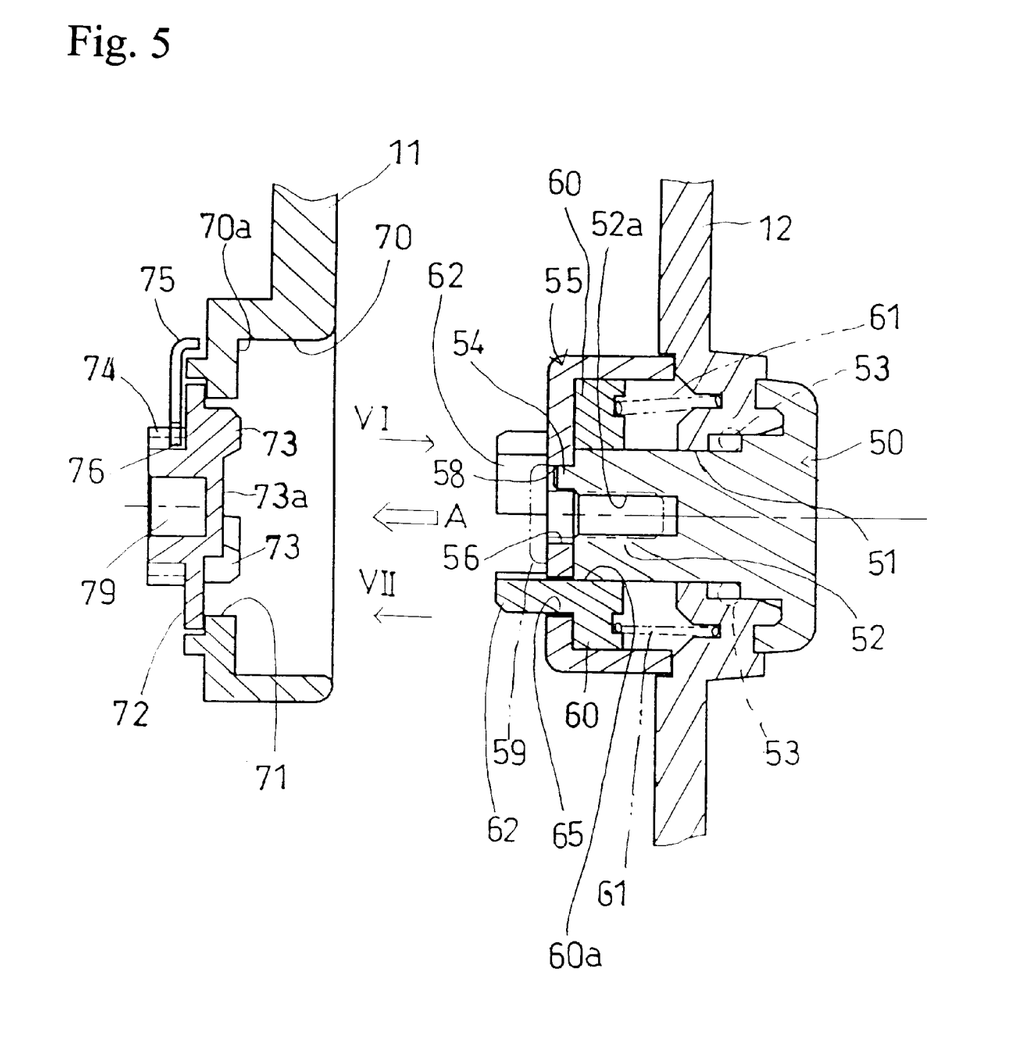
FIG. 5 is a sectional view of an external operation member on a rear cover and an internal rotation member in a camera body, taken along the line V—V in FIG. 1.

The rear cover 12 rotatably supports a diopter adjustment knob 50 in the vicinity of the view window 32. The diopter adjustment lens 31 is moved in the direction of the optical axis 02 in association with the rotation of the diopter adjustment knob 50 as follows (see FIGS. 4 through 7):

As can be seen in FIG. 5, the rear cover 12 is provided with an opening 51 corresponding to the diopter adjustment knob 50 and a shaft portion 52 of the diopter adjustment knob 50 is rotatably inserted in the opening 51. The shaft portion 52 is provided with an axially extending threaded hole 52a and three connection projections 54 around the threaded hole 52a on the end of the shaft portion. There is an O-ring (sealing member) 53 between the diopter adjustment knob 50 and the rear cover 12 to seal the shaft portion 52 in a water-tight fashion. The O-ring 53 is held and deformed between the diopter adjustment knob 50 and the rear cover 12 to seal therebetween. The O-ring 53 shown in FIG. 5 is in a free state prior to deformation.

The rear cover 12 is provided on the surface thereof opposed to the camera body with a transmission member receiving cylinder (integral rotation member) 55 which is in turn provided with a screw receiving hole 56 corresponding to the threaded hole 52a and three connection holes 58 which are engaged with the three connection projections 54, around the screw receiving hole 56. When a securing screw 59 is screwed and fastened in the threaded hole 52a through the screw receiving hole 56, the diopter adjustment knob 50 is secured to the transmission member receiving cylinder 55. In this state, the head of the securing screw 59 prevents the diopter adjustment knob 50 from being detached from the transmission member receiving cylinder 55. When the diopter adjustment knob 50 is rotated, the transmission member receiving cylinder 55 is rotated together through the connection projections 54 and holes 58.

The transmission member receiving cylinder 55 is provided therein with a transmission member 60. The transmission member 60 is provided with a through hole 60a in which the shaft portion 52 of the diopter adjusting knob 50 is slidably fitted, so that the transmission member 60 is supported to move in the direction of the center axis of the shaft portion 52 of the diopter adjusting knob 50. The transmission member 60 is equipped at its one end with three arc rotation transmission projections 62. The transmission member receiving cylinder 55 is provided with three arc engagement holes 65 corresponding to the rotation transmission projections 62, around the screw receiving hole 56 and the connection holes 58. The transmission member 60 is movable between a first position (projected position) in which the three rotation transmission projections 62 protrude from the transmission member receiving cylinder 55 through the engagement holes 65 and a second position (retracted position) in which the rotation transmission projections 62 do not protrude from the transmission member receiving cylinder 55 through the engagement holes 65. There is a biasing spring 61 between the transmission member 60 and the rear cover 12 to bias the transmission member 60 in the direction in which the rotation transmission projections 62 protrude from the engagement holes 65. The biasing spring 61 is a compression coil spring which resists against compression force.

The three rotation transmission projections 62 of the transmission member 60 are fitted in the corresponding engagement holes 65 even in the second position (i.e., the retracted position of the transmission member 60) in which the rotation transmission projections 62 do not protrude from the transmission member receiving cylinder 55. Consequently, the rotation of the transmission member receiving cylinder 55 is transmitted to the transmission member 60 by the engagement of the rotation transmission projections 62 and the engagement holes 65, regardless of the axial position of the transmission member 60. As mentioned above, the transmission member receiving cylinder 55 is rotated together with the diopter adjustment knob 50. Therefore, the diopter adjustment knob 50, the transmission member receiving cylinder 55 and transmission member 60 are rotated together. This arrangement to transmit the rotation of the diopter adjustment knob 50 to the transmission member 60 simplifies the assembly. Namely,, the transmission member 60 is inserted in the shaft portion 52 after the diopter adjustment knob 50 is attached to the rear cover 12, and thereafter, the transmission member receiving cylinder 55 is secured to the diopter adjustment knob 50 by the securing screw 59. Consequently, it is possible to prevent the diopter adjustment knob 50 from being disengaged from the rear cover 12 and to transmit the axial movement and rotation of the transmission member 60 by the securing screw 59 only.

The camera body 11 is provided with a circular hole 70 whose diameter corresponds to the outer diameter of the transmission member receiving cylinder 55. The circular hole 70 is provided on its bottom surface 70a with a circular opening 71 through which an association rotation disk (lens association member) 72 is exposed.

Figure 6:
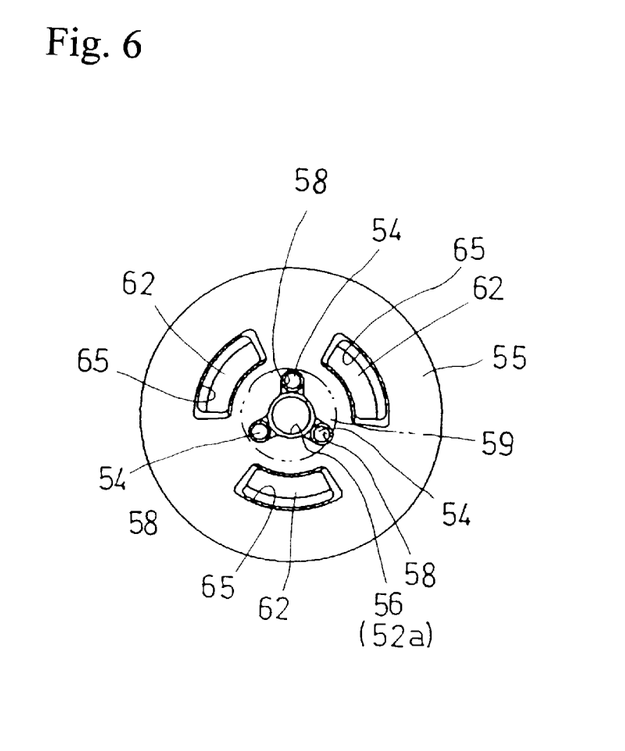
FIG. 6 is an end view viewed from the direction VI in FIG. 5.
Figure 7:
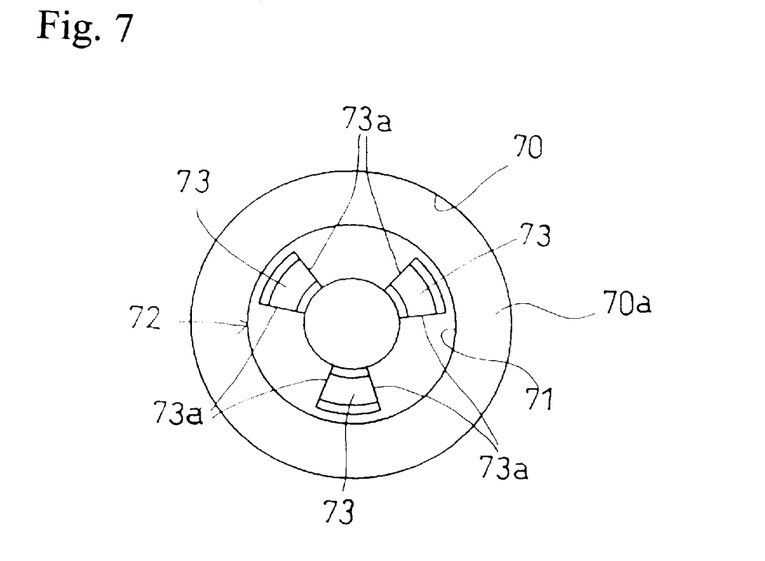
FIG. 7 is an end view viewed from the direction VII in FIG. 5.

The association rotation disk 72 is supported by a shaft 79 in the camera body 11 so as to rotate about an axis which is substantially identical to the axis of the diopter adjustment knob 50 when the rear cover 12 is closed. The association rotation disk 72 is equipped, on the surface thereof opposed to the circular opening 71, with three projections 73 which are spaced in the circumferential direction at a distance corresponding to the circumferential length of the rotation transmission projections 62, wherein the rotation transmission projections 62 can be engaged between the projections 73. In other words, the association rotation disk 72 is provided on the surface thereof opposed to the transmission member receiving cylinder 55, with three rotation transmission recesses 73a in which the rotation transmission projections 62 can be fitted. Note that the end surfaces of the projections 73 are substantially flush with the bottom surface 70a of the circular hole 70.

The association rotation disk 72 is provided, on the surface thereof adjacent the inside of the camera body, with a gear 74 about the shaft portion 52. The gear 74 is in mesh with a rack 76 of an association cam member 75. The association cam member 75 is supported to linearly move in directions substantially perpendicular to the optical axis 02. The association cam member 75 can be moved in the directions substantially perpendicular to the optical axis 02 due to the engagement of the rack 76 and the gear 74, when the rotation of the association rotation disk 72 takes place.

As shown in FIG. 4, the association cam member 75 is provided with a cam plate 77 which is in turn provided with a pair of cam grooves 78 which extend obliquely with respect to the direction of the movement of the association cam member 75. The drive projections 42 of the diopter adjustment lens 31 are slidably fitted in the cam grooves 78. Since the direction of the cam grooves 78 is inclined also with respect to the direction of the movement of the diopter adjustment lens 31 (i.e., the direction of the optical axis 02), the movement of the association cam member 75 caused by the rotation of the association rotation disk 72 causes the diopter adjustment lens 31 to move along the optical axis 02 due to the engagement of the drive pins 42 in the cam grooves 78.

If the diopter adjustment knob 50 is rotated in the clockwise or anti-clockwise direction when the rotation transmission projections 62 are engaged in the rotation transmission recesses 73a, the rotation of the knob 50 is transmitted to the association rotation disk 72. As a result of the rotation of the association rotation disk 72, the association cam member 75 is linearly moved in the right or left direction, and consequently, the diopter adjustment lens 31 is moved backward or forward in the direction of the optical axis 02 to adjust the diopter of the finder.

When the rear cover 12 is opened, the diopter adjustment knob 50 can be rotated, independently of the association rotation disk 72. Therefore, when the rear cover 12 is closed again, the rotation transmission projections 62 are not always in a position in which they engage with the rotation transmission recesses 73a. In a camera having the above-described diopter adjusting mechanism, the non-engagement of the rotation transmission projections 62 of the diopter adjustment knob 50 with the rotation transmission recesses 73a of the association rotation disk 72 can be compensated as follows:

When the rear cover 12 is closed, the transmission member receiving cylinder 55 is inserted in the circular hole 70 in the direction "A" in FIG. 5. If the rotation transmission projections 62 of the rear cover 12 cannot be engaged in the rotation transmission recesses 73a of the camera body 11 due to a phase difference, the end surfaces of the rotation transmission projections 62 abut against the end surfaces of the projections 73. In this state, if the closing operation of the rear cover 12 continues, no movement of the projections 73 occurs in the axial direction of the association rotation disk 72, and the transmission member 60 is forced toward the rear cover 12 against the biasing spring 61, wherein the transmission member 60 is moved to the retracted position within the transmission member receiving cylinder 55. Consequently, the rear cover 12 can be closed to a restricted position in which the end surface of the transmission member receiving cylinder 55 abuts against the bottom surface 70a of the circular hole 70. The restricted position corresponds to the closed position of the rear cover 12 in which the rear cover 12 is locked by a locking mechanism (not shown), regardless of the engagement or disengagement of the rotation transmission projections 62 with or from the rotation transmission recesses 73a. In this position, since the transmission member 60 is held in the retracted position in which the rotation transmission projections 62 are retracted in the transmission member receiving cylinder 55, the rotation transmission projections 62 are disengaged from the rotation transmission recesses 73a, and hence the diopter adjustment knob 50 and the association rotation disk 72 can be relatively rotated.

In this disengagement position, if the diopter adjustment knob 50 is rotated, the rotation transmission projections 62 can be moved forward at an angular phase at which the end surfaces of the rotation transmission projections 62 do not interfere with those of the projections 73, wherein the transmission member 60 is returned to the biasing position (projected position) shown in FIG. 5 by the restoring force of the biasing spring 61. Consequently, the rotation transmission projections 62 protrude and engage in the corresponding rotation transmission recesses 73a. As a result of the engagement of the rotation transmission projections 62 with the rotation transmission recesses 73a, the rotation of the diopter adjustment knob 50 is transmitted to the association rotation disk 72. Thus, the diopter adjustment lens 31 is driven in accordance with the rotation of the diopter adjustment knob 50 to adjust the diopter of the view finder.

As can be understood from the foregoing, when the rear cover 12 is closed, the diopter adjustment knob 50 on the rear cover side and the association rotation disk 72 on the camera body are interconnected at an angular phase in which the rotation transmission projections 62 can engage with the rotation transmission recesses 73a. At an angular phase in which the rotation transmission projections 62 do not engage with the rotation transmission recesses 73a, the rotation transmission projections 62 are retracted wherein the diopter adjustment knob 50 and the association rotation disk 72 can be relatively rotated. Thus, even if there is a phase difference between the diopter adjustment knob 50 and the association rotation disk 72, the rear cover 12 can still be closed, and the rotation of the diopter adjustment knob 50 easily causes the same to be connected to the association rotation disk 72.

The present invention is not limited to the illustrated embodiment. In the illustrated embodiment, the compact zoom camera 10 is a water-proof camera, and the diopter adjustment mechanism constitutes a water-proof structure using the O-ring 53 provided between the diopter adjustment knob 50 and the rear cover 12. The present invention can be applied to a camera other than a water-proof camera. Moreover, the camera can be a fixed focus camera and accordingly, the view finder is not limited to a zoom finder.

Furthermore, the association drive mechanism which transmits the drive force from the rotating member to the diopter adjustment lens is not limited to the gear-driven cam plate in the illustrated embodiment.

Although the movable transmission member 60 on the rear cover side is provided with the rotation transmission projections 62 and the association rotation disk 72 on the camera body side is provided with the rotation transmission recesses 73a; in the illustrated embodiment, it is possible to provide the rotation transmission projections and the rotation transmission recesses on the association rotation disk 72 and the transmission member 60, respectively.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having apparatus for adjusting a diopter of a view finder which includes a camera body, a rear cover which opens and closes the rear surface of said camera body, and a diopter adjusting mechanism for a finder optical system, said diopter adjusting mechanism having a diopter adjustment lens, comprising:

a diopter adjustment knob provided on said rear cover, which can be externally rotated;

a transmission member provided on said rear cover that is opposed to said camera body and connected to said diopter adjustment knob so as to relatively move in the direction along the axis of rotation of said diopter adjustment knob and not to relatively rotate thereto;

a biasing spring which biases said transmission member to project toward said camera body side;

a lens association rotation member which is supported by said camera body so as to rotate about an axis identical to the axis of said diopter adjustment knob and which moves said diopter adjustment lens in the optical axis direction, in accordance with the rotation of said lens association rotation member; and at least one rotation transmission projection and at least one rotation transmission recess provided on one and the other of said transmission member and said lens association rotation member;

wherein said transmission member is biased by said biasing spring wherein said transmission member projects to a projected position close to said camera body when said rotation transmission projection engages with said rotation transmission recess, and is retracted to a retracted position in said rear cover when said rotation transmission projection does not engage with said rotation transmission recess.

2. A camera according to claim 1, wherein said diopter adjustment knob is provided with a shaft portion which projects toward said camera body;

said transmission member is provided with a through hole in which said shaft portion is slidably fitted in the axial direction, and is provided with said at least one rotation transmission projection which projects toward said camera body;

said camera further comprising:

an integral rotation member, separate from said diopter adjustment knob, which is secured to the front end of said shaft portion of said diopter adjustment knob to rotate together therewith;

an engagement hole formed in said integral rotation member, in which said rotation transmission projection of said transmission member is fitted so as to move in the projecting direction of said projection, and so as not to move in the rotational direction;

whereby when said diopter adjustment knob is rotated, the rotation is transmitted to said transmission member through said engagement hole of said integral rotation member and said rotation transmission projection of said transmission member.

3. A camera according to claim 1, wherein said biasing spring is a compression coil spring provided between said transmission member and said rear cover.

4. A camera according to claim 1, wherein said camera is a water-proof and drip-proof camera and wherein said diopter adjustment knob and said rear cover are sealed water-tight by a sealing member.

5. A camera according to claim 1, further comprising an association cam member, which is moveable in a direction substantially perpendicular to the optical axis, having at least one cam groove in which a projection of said diopter adjustment lens slidably engages; wherein said diopter adjustment lens can be moved backward or forward along the optical axis via the corresponding linear movement of said association cam member.

6. A camera according to claim 5, wherein said lens association rotation member comprises a gear portion and said association cam member comprises a rack which engages with said gear portion; wherein said association cam member is linearly moved via the rotational movement of said lens association rotation member.

7. A diopter adjusting mechanism for a finder optical system of a camera having a camera body and a rear cover, comprising:

a diopter adjustment lens provided in said camera body movable in an optical axis thereof;

a lens association rotation member which moves said diopter adjustment lens in the optical axis direction by the rotation thereof, said lens association rotation member being provided in said camera body;

a manually rotatable diopter adjustment knob provided on said rear cover;

a transmission member provided on said rear cover, said transmission member being connected to said diopter adjustment knob relatively movable in the axial direction and so as to rotate together with said diopter adjustment knob;

a rotation transmission projection and a rotation transmission recess provided on one and the other of said transmission member and said lens association rotation member; and a biasing spring which biases said transmission member to project toward said lens association rotation member to engage said rotation transmission projection with said rotation transmission recess;

wherein said biasing spring allows to retract said transmission member in said rear cover when said rotation transmission projection does not engage with said rotation transmission recess.

8. A diopter adjusting mechanism according to claim 7, wherein said biasing spring is a compression coil spring provided between said transmission member and said rear cover.

9. A diopter adjusting mechanism according to claim 7, wherein said camera is a water-proof and drip-proof camera and wherein said diopter adjustment knob and said rear cover are sealed water-tight by a sealing member.

10. A diopter adjusting mechanism according to claim 7, further comprising an association cam member, which is moveable in a direction substantially perpendicular to the optical axis, having at least one cam groove in which a projection of said diopter adjustment lens slidably engages; wherein said diopter adjustment lens can be moved backward or forward along the optical axis via the corresponding linear movement of said association cam member.

11. A diopter adjusting mechanism according to claim 10, wherein said lens association rotation member comprises a gear portion and said association cam member comprises a rack which engages with said gear portion; wherein said association cam member is linearly moved via the rotational movement of said lens association rotation member.

* * * * *